(12) United States Patent
Hasegawa et al.

(10) Patent No.: US 10,792,599 B2
(45) Date of Patent: Oct. 6, 2020

(54) DUST COLLECTION METHOD, DUST COLLECTION DEVICE, AND LASER PROCESSING MACHINE

(71) Applicant: AFLAIR INC., Kanagawa (JP)

(72) Inventors: Akinobu Hasegawa, Kanagawa (JP); Shyrcherng Kuo, Taipei (TW)

(73) Assignee: AFLAIR INC., Kanagawa (JP)

( * ) Notice: Subject to any disclaimer, the term of this patent is extended or adjusted under 35 U.S.C. 154(b) by 182 days.

(21) Appl. No.: 16/089,353

(22) PCT Filed: Mar. 31, 2017

(86) PCT No.: PCT/JP2017/013519
§ 371 (c)(1),
(2) Date: Sep. 27, 2018

(87) PCT Pub. No.: WO2017/170980
PCT Pub. Date: Oct. 5, 2017

(65) Prior Publication Data
US 2019/0111370 A1    Apr. 18, 2019

(30) Foreign Application Priority Data

Apr. 1, 2016 (JP) .................. 2016-074540

(51) Int. Cl.
*B01D 45/12*     (2006.01)
*B01D 47/06*     (2006.01)
(Continued)

(52) U.S. Cl.
CPC ............. *B01D 45/12* (2013.01); *B01D 46/48* (2013.01); *B01D 47/00* (2013.01); *B01D 47/06* (2013.01); *B23K 26/16* (2013.01)

(58) Field of Classification Search
None
See application file for complete search history.

(56) References Cited

U.S. PATENT DOCUMENTS 7,559,982 B2 *    7/2009 Arai .................. B01D 45/12
                                                   95/214
2006/0086253 A1    4/2006 Gaur et al.

FOREIGN PATENT DOCUMENTS

DE    2120615 A1    11/1972
ES    2002360 A6     8/1988
(Continued)

OTHER PUBLICATIONS

Ellison, W, as modified by Control of Water Pollution from the Discharge of Liquid Effluents of Wet-Collector Type Gas-Cleaning Systems, 1970, ASME Winter Annual Meeting, pp. 137-142. (Year: 1970).*

(Continued)

*Primary Examiner* — Derek N Mueller
(74) *Attorney, Agent, or Firm* — Nakanishi IP Associates, LLC

(57) ABSTRACT

Provided is a dust collection method using a dust collection device. The dust collection method includes: a step of forming a rotating airflow by means of suction with a suction device, the rotating airflow progressing while spiraling along an inner wall surface of a main body; a step of supplying liquid from a supply nozzle; a step of spreading out the liquid with the rotating airflow on the inner wall surface thereby to continuously form a liquid catcher, the liquid catcher rotating as a film of the liquid; and a step of separating smoke and/or dust to outside by centrifugal force due to the rotating airflow and capturing the smoke and/or dust with the liquid catcher, the smoke and/or dust being contained in air introduced to the inside of the main body.

7 Claims, 14 Drawing Sheets

(51) Int. Cl.
*B23K 26/16* (2006.01)
*B01D 47/00* (2006.01)
*B01D 46/48* (2006.01)

(56) References Cited

FOREIGN PATENT DOCUMENTS

| | | |
|---|---|---|
| JP | S49-70565 U1 | 6/1974 |
| JP | S53-17886 U1 | 2/1978 |
| JP | H8-52383 A | 2/1996 |
| JP | H10-192634 A | 7/1998 |
| JP | H11-207124 A | 8/1999 |
| JP | H11-207125 A | 8/1999 |
| JP | 2000-93726 A | 4/2000 |
| JP | 2004-001118 A | 1/2004 |
| JP | 2015-120138 A | 7/2015 |
| JP | 2015-174102 A | 10/2015 |

OTHER PUBLICATIONS

International Search Report issued in PCT/JP2017/013519 dated May 16, 2017 with English Translation (5 pages).
Written Opinion of International Searching Authority issued in PCT/JP2017/013519 dated May 16, 2017 (4 pages).
Extended European Search Report issued in European Patent Application No. 17775512.1, dated Mar. 17, 2020 (7 pages).

* cited by examiner

DUST COLLECTION METHOD, DUST COLLECTION DEVICE, AND LASER PROCESSING MACHINE

TECHNICAL FIELD

The present invention relates to a dust collection method, a dust collection device, and a laser processing machine and more specifically to a dust collection method and a dust collection device that are used for a processing machine or the like and a laser processing machine to which the dust collection device is applied.

BACKGROUND ART

When processing an object with a laser processing machine or the like, smoke and/or dust (also referred to as "dust and the like," hereinafter) are generated from the object during the processing. It is therefore necessary to proceed with the processing while removing such dust and the like during the processing. To remove dust and the like, the generated dust and the like are usually sucked and the sucked air is made to pass through a filter thereby to capture the dust and the like.

Patent Document 1 discloses a dust collector configured to take in air containing dust from a suction port disposed on a side wall of a vortex chamber, generate a spiral flow in the vortex chamber to separate the dust, and collect the dust using a main filter disposed at the central axis position in the vortex chamber.

Patent Document 2 discloses a dust processing device comprising a cyclone-type separating means that spirals dust-containing air to separate it into dust and air, a shower means that injects water toward the cyclone-type separating means, a waste liquid storing means that stores the waste liquid, a drain means that discharges the waste liquid, a filter means that is disposed in an inner tube of the cyclone-type separating means, and an exhaust means that exhausts the air filtered by the filter means.

PRIOR ART DOCUMENTS

Patent Documents

[Patent Document 1] JP2015-120138A
[Patent Document 2] JP2004-001118A

SUMMARY OF THE INVENTION

Problems to be Solved by the Invention

However, air filters for filtration of dust and the like are immediately clogged up when the amount of the generated dust and the like is large or when viscous smoke is generated, and the suction power tends to decrease. Accordingly, a problem arises in that the frequency of maintenance for filter replacement and the like is high.

In recent years, to reduce the frequency of filter replacement, a method is used which utilizes a bag-shaped filter (bag filter) made of cloth or nonwoven cloth for filtration of airflow containing dust and smoke. In this method, the trapping effect by the deposited particles is larger than the trapping by the filter itself. When a certain time interval or pressure loss reaches a set value, therefore, a process of brushing off the deposited particles is required. However, if viscous smoke and tar adhere thereto, they cannot be removed sufficiently by the process of brushing them off.

Objects of the present invention include providing a dust collection method, a dust collection device, and a laser processing machine with which dust and the like can be efficiently separated and removed without using a filter.

Means for Solving the Problems

To solve the above problems, according to an aspect of the present invention, there is provided a dust collection method using a dust collection device, the dust collection device comprising: a main body provided in a tubular shape; an exhaust tube provided so as to extend outside from midstream inside the main body through one end of the main body, the exhaust tube cooperating with a suction device to suck air inside the main body; a supply nozzle for supplying a liquid to inside of the main body; a recovery unit for recovering the liquid from the main body; and a pump for returning the liquid from the recovery unit to the supply nozzle, the dust collection method being characterized by comprising: a step of forming a rotating airflow by means of suction with the suction device, the rotating airflow progressing while spiraling along an inner wall surface of the main body; a step of supplying the liquid from the supply nozzle; a step of spreading out the liquid with the rotating airflow on the inner wall surface thereby to continuously form a liquid catcher, the liquid catcher rotating as a film of the liquid; and a step of separating smoke and/or dust to outside by centrifugal force due to the rotating airflow and capturing the smoke and/or dust with the liquid catcher, the smoke and/or dust being contained in air introduced to the inside of the main body.

According to such a configuration, the rotating airflow is generated inside the main body by sucking air into the main body, and the smoke and/or dust contained in the air are centrifugally separated. The smoke and/or dust can therefore be separated without using a filter through which the air is made to pass, and the purified air can be discharged without pressure loss due to the filter. Furthermore, the liquid catcher which rotates along the inner wall surface of the main body is formed utilizing the rotating airflow, and it is possible to efficiently capture the centrifugally separated smoke, dust, viscous tar, and the like with the liquid catcher. The liquid is recovered in the recovery unit and returned to the supply nozzle by the pump. This can continuously form the liquid catcher while circulating the liquid.

In the above dust collection method, during the dust collection, the liquid may be continuously or intermittently supplied from the supply nozzle, a part of the liquid constituting the liquid catcher may be recovered from the main body using the recovery unit, the recovered liquid may be returned to the supply nozzle using the pump thereby to circulate the liquid, and the liquid catcher rotating inside the main body may be continuously formed.

In the above dust collection method, a rear end of the exhaust tube may be provided with a rear end opening part, the suction device may be provided with a suction port, and the rear end opening part and the suction port may be arranged to be separate from each other in the recovery unit. During the dust collection, a part of the liquid suctioned from the exhaust tube may be sent from the rear end opening part to the recovery unit. Through this operation, the liquid-containing air taken into the recovery unit from the rear end opening part of the exhaust tube is separated from the liquid in the space in the recovery unit and it is possible to suppress suction of the liquid from the suction port of the suction device.

In the above dust collection method, the recovery unit may be provided at the subsequent stage of the exhaust tube, and the suction port may be connected to an opening part provided at the recovery unit. This allows the liquid, which is contained in the air sucked from the exhaust tube, to be recovered in the recovery unit. Moreover, the suction port of the suction device is connected to the opening part of the recovery unit and, therefore, the airflow due to suction is generated in the space in the recovery unit to separate the air and the liquid. This can suppress suction of the liquid from the suction port of the suction device.

According to an aspect of the present invention, there is provided a dust collection device comprising: a main body provided in a tubular shape and generating a rotating airflow inside the main body by sucked air; an exhaust tube provided so as to extend outside from midstream inside the main body through one end of the main body, the exhaust tube cooperating with a suction device to suck air in the main body; a supply nozzle for supplying a liquid for forming a liquid catcher utilizing the rotating airflow, the liquid catcher rotating as a film of the liquid along an inner wall surface of the main body; a recovery unit for recovering the liquid included in the rotating airflow in the main body; and a pump for returning the liquid from the recovery unit to the supply nozzle. The dust collection device may be configured such that the recovery unit is provided on a side opposite to the exhaust tube inside the main body, the exhaust tube has an inner tube and an outer tube, one end of the outer tube on the recovery unit side extends beyond one end of the inner tube on the recovery unit side toward the recovery unit side, a gap is provided between the other end of the outer tube and an outer circumferential surface of the inner tube, and the other end of the inner tube extends outside from the main body. This allows the recovery unit and the main body to be integrated with each other.

The above dust collection device may be configured such that a net-like body is provided in the gap formed between the other end of the outer tube and the outer circumferential surface of the inner tube and the liquid is injected from the supply nozzle toward the net-like body. This allows the liquid to diffuse when passing through the net-like body, and the liquid can be efficiently included in the rotating airflow.

The above dust collection device may be configured such the supply nozzle injects the liquid toward the direction of a flow of the rotating airflow. This allows the liquid to efficiently diffuse along the rotating airflow.

The above dust collection device may further comprise a filter provided between the pump and the supply nozzle. This allows the filter to remove dust and the like contained in the liquid recovered by the recovery unit, and the clean liquid can be returned to the supply nozzle to prevent clogging of the nozzle.

According to an aspect of the present invention, there is provided a dust collection device characterized by comprising: a main body provided in a tubular shape and having a straight body part having an approximately constant inner diameter from one end to the other end, the main body being obliquely arranged with the other end side up, the main body generating a rotating airflow inside the main body by sucked air; an exhaust tube provided so as to extend outside from midstream inside the main body through the one end of the main body, the exhaust tube cooperating with a suction device to suck air in the main body; an introduction part to which an introduction pipe is connected, the introduction pipe sucking air into the main body from outside, the introduction part being provided on the one end side of the main body; and a supply nozzle for supplying a liquid to inside of the main body.

According to such a configuration, the rotating airflow is generated inside the main body by sucking air into the main body, and the smoke and/or dust contained in the air are centrifugally separated. The smoke and/or dust can therefore be separated without using a filter through which the air is made to pass, and the purified air can be discharged without pressure loss due to the filter. Furthermore, the liquid catcher which rotates along the inner wall surface of the main body is formed utilizing the rotating airflow, and it is possible to efficiently capture the centrifugally separated smoke, dust, viscous tar, and the like with the liquid catcher.

In the above dust collection device, the gap between the main body and the exhaust tube in the diameter direction may be narrower than the inner diameter of the introduction pipe. This can narrow the flow path of air flowing from the introduction pipe to the main body, thus increasing the rotation speed of the rotating airflow generated outside the exhaust tube.

In the above dust collection device, the introduction pipe may be connected to the main body obliquely downward from obliquely above the main body. This can suppress the flowback of the liquid to the introduction pipe when the liquid rotates in accordance with the rotating airflow in the main body.

According to an aspect of the present invention, there is provided a dust collection device comprising: a main body provided in a tubular shape and generating a rotating airflow inside the main body by sucked air; an inner tube provided so as to extend outside from midstream inside the main body through one end of the main body; an outer tube provided outside the inner tube in the main body and arranged approximately coaxially with the inner tube so that gaps are provided between the outer tube and the inner tube and between the outer tube and the main body; a supply nozzle for supplying a liquid to inside of the main body; a recovery unit provided below the main body and recovering the liquid included in the rotating airflow in the main body; and a pipe connected to the main body and communicating with the gap between the outer tube and the main body inside the main body. This dust collection device is characterized in that one end of the outer tube on the recovery unit side extends beyond one end of the inner tube on the recovery unit side toward the recovery unit side, a gap is provided between the other end of the outer tube and an outer circumferential surface of the inner tube, and the other end of the inner tube extends outside from the main body.

According to such a configuration, the device configuration can be reduced in size because the recovery unit is integrated with the main body. Moreover, the liquid is recovered in the lower recovery unit along the inner tube and the outer tube and, therefore, piping such as a drain is unnecessary. This allows the device configuration to be simplified.

According to an aspect of the present invention, there is provided a laser processing machine characterized by comprising: a laser emitting head for emitting laser light with which an object is irradiated; a duct for sucking and taking in smoke and/or dust generated from the object; and the above dust collection device provided in midstream of the duct.

According to such a laser processing machine, smoke and/or dust generated during the laser processing can be separated without using a filter through which air is made to pass, and it is possible to efficiently capture the centrifugally separated smoke, dust, viscous tar, and the like with the liquid catcher.

Effect of the Invention

According to the present invention, dust and the like can be efficiently separated and removed without using a filter.

BRIEF DESCRIPTION OF DRAWING(S)

FIG. 1 is a perspective view illustrating a configuration example of a processing machine.

FIGS. 2(a) and 2(b) are views illustrating details of a dust collection device according to the present embodiment.

Figure 13A:
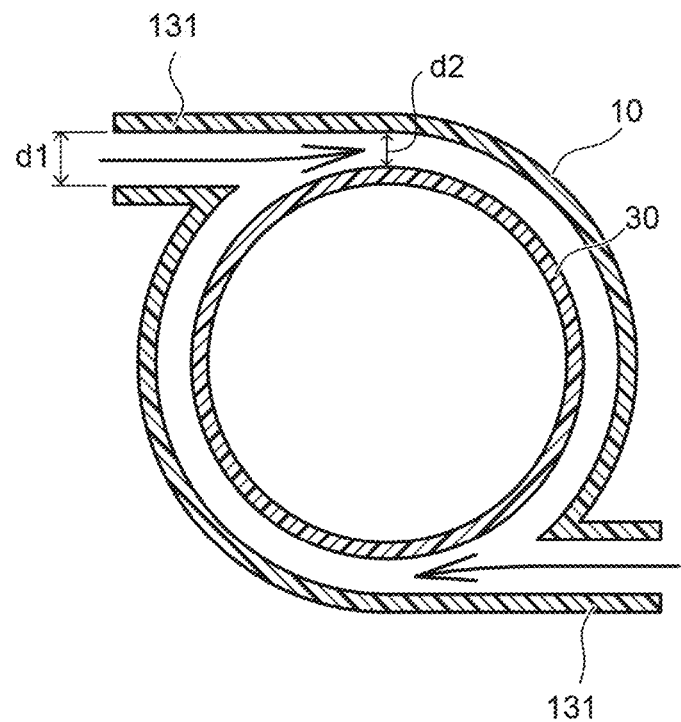
Figure 13B:
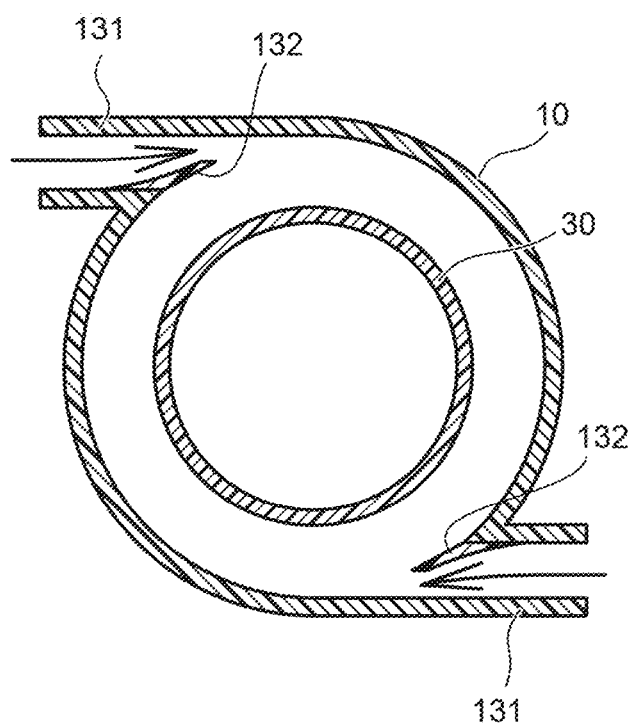

FIGS. 13(a) and 13(b) are cross-sectional views illustrating examples of introduction ports.

Figure 14:
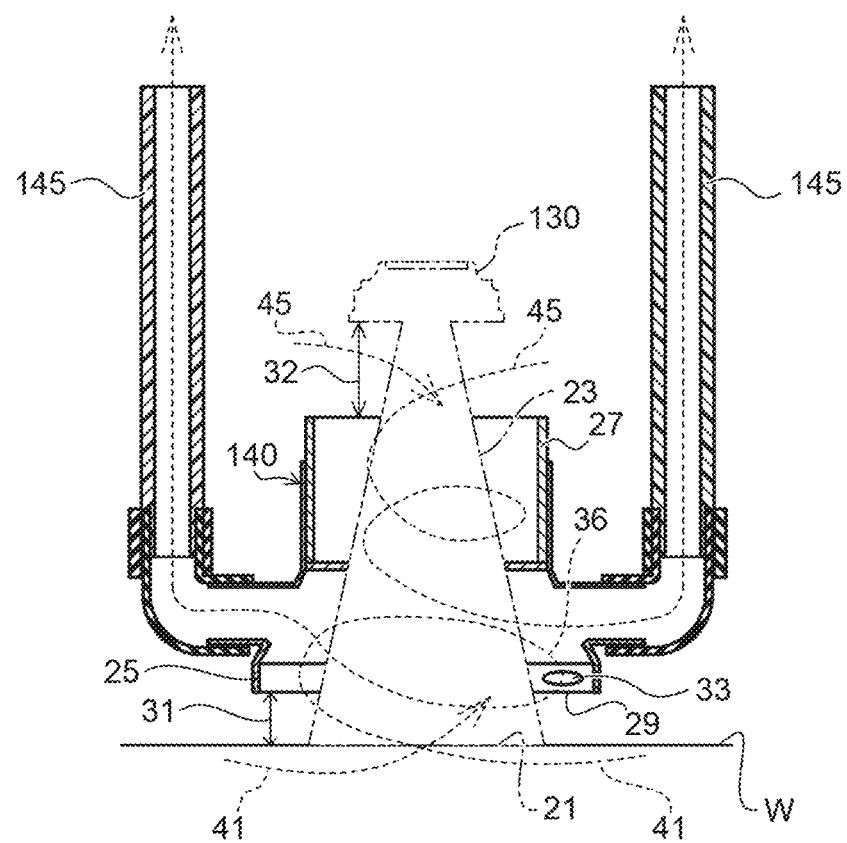

FIG. 14 is a cross-sectional view illustrating an example of a dust collection nozzle.

MODE(S) FOR CARRYING OUT THE INVENTION

Hereinafter, embodiments of the present invention will be described with reference to the drawings. In the following description, the same members are denoted by the same reference numerals, and the description of members once described will be omitted as appropriate.
(Configuration of Processing Machine)

Figure 1:
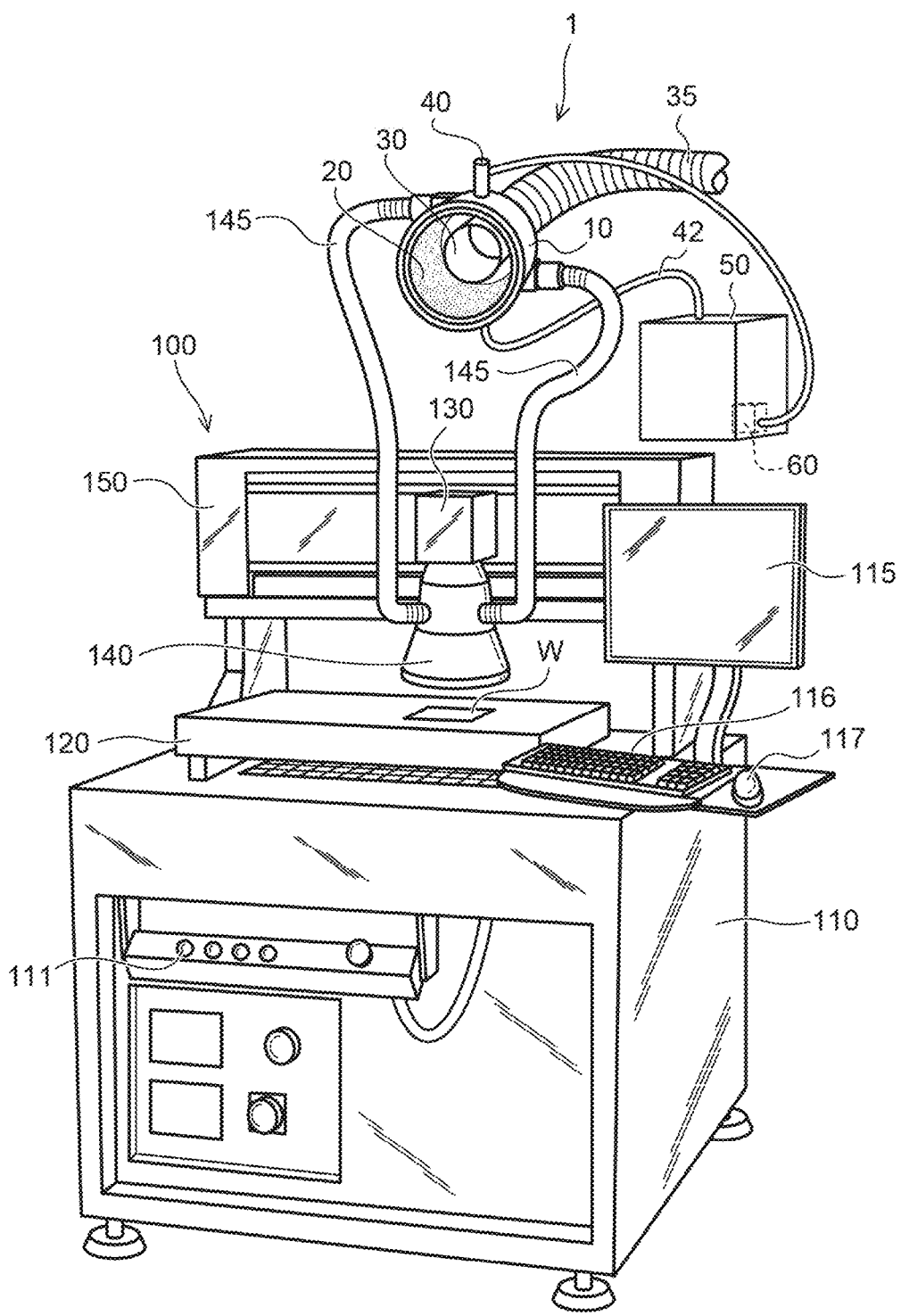

FIG. 1 is a perspective view illustrating a configuration example of a processing machine.

The dust collection device 1 according to the present embodiment captures dust and the like generated from an object W processed by a processing machine 100. The processing machine 100 illustrated in FIG. 1 is a laser processing machine. The laser processing machine is a device that utilizes the energy of laser light to perform processing such as cutting of the object W.

The processing machine 100 comprises a processing machine main body 110, a stage 120, a laser emitting head 130, a dust collection nozzle 140, a moving unit 150, and the dust collection device 1 according to the present embodiment. Switches 111 are arranged on the front surface of the processing machine main body 110, and a power source unit, a control circuit, a negative pressure pump, and other necessary components (not illustrated) are incorporated in the processing machine main body 110. Input/output devices such as a display 115, a keyboard 116, and a mouse 117 are arranged in the vicinity of the processing machine main body 110 so that setting, reading, and storage of various processing conditions and processing control by the processing program can be performed.

The stage 120, which is disposed on the processing machine main body 110, can move in one direction (Y-axis direction, for example). The object W is placed on the stage 120. The object W is adsorbed and secured onto the stage 120, for example, by negative pressure.

The moving unit 150 is configured, for example, in a gate shape and arranged above the stage 120. The laser emitting head 130 is attached to the moving unit 150. The laser emitting head 130 is configured to be movable in one direction (X-axis direction, for example) by the moving unit 150. In the present embodiment, the laser emitting head 130 is moved in the X-axis direction by the moving unit 150 while the stage 120 is moved in the Y-axis direction so that the relative positional relationships between the laser light and the object W along the X-axis and Y-axis are set, but any one of the moving unit 150 and the stage 120 may be configured to be movable along the X-axis and Y-axis.

The laser emitting head 130 focuses the laser light on the object W by an optical system (not illustrated), and the object W is thus irradiated with the laser light. In the present embodiment, the laser emitting head 130 is configured to be capable of scanning the irradiation range of the laser light by varying the irradiation angle of the laser light using one or more scan mirrors. The laser emitting head 130 is, for example, a galvanometer scanner head. Examples of the object W to be processed include those of various materials such as metal, resin, paper, and wood.

The dust collection nozzle 140 sucks and collects dust and the like generated from the object W during the laser processing. In the present embodiment, the dust collection nozzle 140, which is disposed above the object W, includes a circular truncated cone-shaped hood that surrounds the irradiation range of the laser light emitted from the laser emitting head 130. The dust collection nozzle 140 is provided with suction ducts 145, and the dust and the like collected by the dust collection nozzle 140 are sucked up through the suction ducts 145.

The dust collection device 1 according to the present embodiment is provided in midstream of ducts that suck and take in dust and the like (i.e. midstream of paths for sucking dust and the like and sending them to a discharge device). The dust collection device 1 comprises a main body 10 provided in a tubular shape, an exhaust tube 30 that extends from inside of the main body 10 to outside, a supply nozzle 40 that supplies a liquid LQ for forming a liquid catcher 20 inside the main body 10, a recovery unit 50 that recovers the liquid LQ, and a pump 60 that returns the liquid LQ from the recovery unit 50 to the supply nozzle 40. For descriptive purposes, the dust collection device 1 is illustrated in FIG. 1 in a state in which the lid of the main body 10 is removed.

To process the object W with this processing machine 100, the object W is first placed on the stage 120 and secured thereto, such as by suction. Then, when the processing procedure is set and executed with a predetermined program, the object W is irradiated with laser light from the laser emitting head 130, and processing (such as cutting, groove processing, or marking) of the object W is carried out by the energy of the laser light. The irradiation position of the laser light is controlled by the scanning of the laser light and the operations of the stage 120 and moving unit 150 in accordance with the processing with the program.

A suction device (not illustrated) is connected to the subsequent stage of the dust collection device 1. During the processing by the processing machine 100, suction of dust and the like is performed by the negative pressure generated by the suction device. That is, dust and the like generated from the object W due to the processing are collected by the dust collection nozzle 140 with the suction force and sent to the dust collection device 1 of the present embodiment via the suction ducts 145.

In the dust collection device 1, dust and the like sucked by the rotating airflow generated inside the main body 10 are centrifugally separated. Further, this rotating airflow is utilized to form the liquid catcher 20 which rotates along the inner wall surface of the main body 10, and the centrifugally separated dust and the like are captured by the liquid catcher 20. Air from which the dust and the like have been removed is discharged from the suction device through the exhaust tube 30 via an exhaust duct 35.

(Details of Dust Collection Device)

Figure 2A:
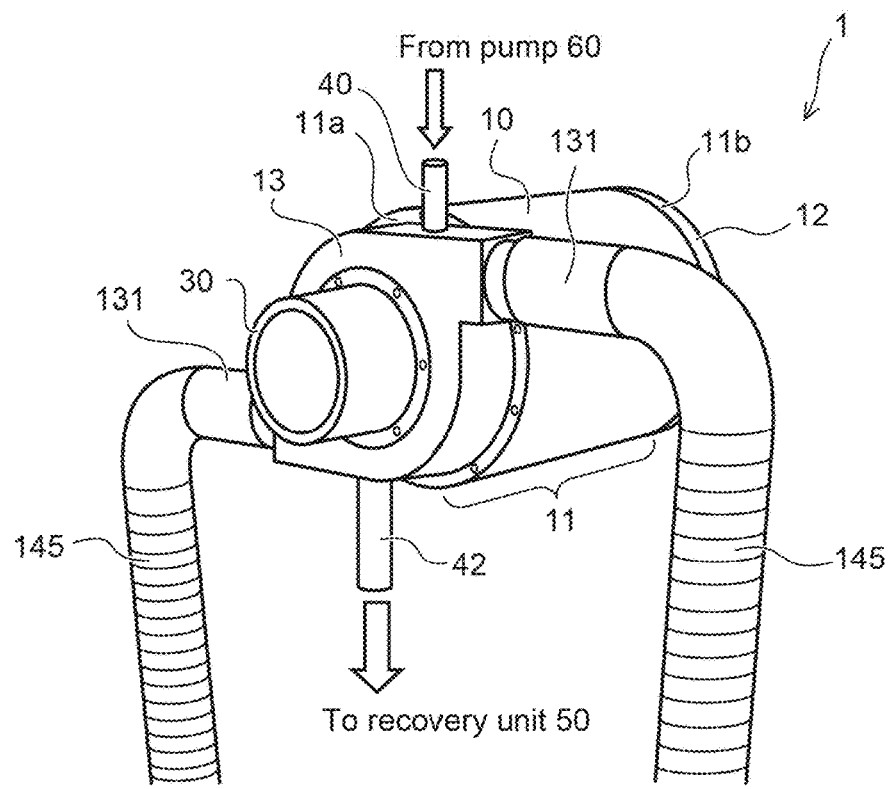
Figure 2B:
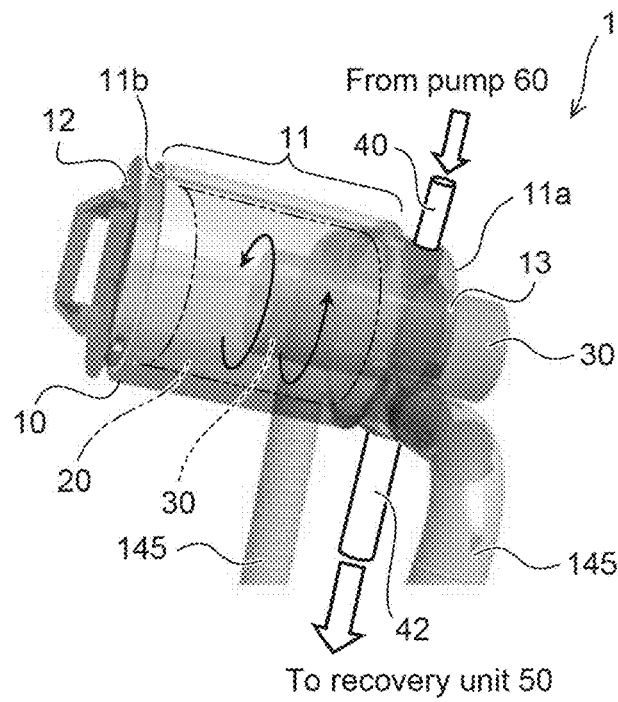

FIGS. 2(*a*) and 2(*b*) are views illustrating details of the dust collection device according to the present embodiment.

Specifically, FIG. 2(*a*) is a perspective view of the dust collection device 1 as viewed obliquely from above, and FIG. 2(*b*) is a see-through view of the dust collection device 1 as viewed from the side.

The main body 10 of the dust collection device 1 is configured, for example, in a cylindrical shape. In an alternative embodiment, the main body 10 may have a polygonal shape. The main body 10 has a straight body part 11 having an approximately constant inner diameter. A lid 12 is detachably provided at an opening end 11*b* of the straight body part 11 (the other end of the main body 10). An introduction part 13 is provided at a rear end 11*a* of the straight body part 11 on the side opposite to the opening end 11*b*. The suction ducts 145 are connected to introduction pipes 131 of the introduction part 13. In the present embodiment, two suction ducts 145 extending from the dust collection nozzle 140 are connected to the introduction pipes 131 of the introduction part 13.

The introduction pipes 131 each extend in the tangential direction of the inner wall surface of the tubular main body 10. The two introduction pipes 131 are provided so as to extend in the opposite directions at positions shifted from each other by 180° in the circumference of the inner wall surface.

The air sucked from the suction ducts 145 is sent from the introduction pipes 131 to the introduction part 13 and taken into the main body 10 while rotating. The air rotated in the introduction part 13 is a rotating airflow that progresses while spiraling along the inner wall surface of the main body 10.

The supply nozzle 40 is provided, for example, at the introduction part 13 of the main body 10. The supply nozzle 40 supplies the liquid LQ to the inside of the main body 10. When the liquid LQ is supplied from the supply nozzle 40 in a state in which the rotating airflow is generated inside the main body 10, the liquid LQ spreads out while rotating on the inner wall surface of the tubular main body 10 by the rotating airflow and constitutes the liquid catcher 20. The liquid catcher 20 rotates inside the main body 10 in accordance with the rotating airflow.

Thus, a state is established in which the rotating liquid LQ forms a film inside the cylindrical main body 10, and the dust and smoke having large specific gravity are captured by the liquid catcher 20. The main body 10 is preferably arranged slightly oblique so that the opening side of the exhaust tube 30 faces upward. A drain 42 is provided below the main body 10. The liquid LQ is recovered into the recovery unit 50 of the subsequent stage from the drain 42. During the dust collection, the liquid LQ is continuously or intermittently supplied from the supply nozzle 40, and the liquid catcher 20 is configured together with the rotating airflow. A certain amount of the liquid LQ is recovered from the drain 42 to the recovery unit 50. Then, the liquid LQ is returned from the recovery unit 50 to the supply nozzle 40 by the pump 60. This allows the liquid LQ to circulate from the supply nozzle 40, the main body 10, and the drain 42 to the recovery unit 50 and then from the pump 60 to the supply nozzle 40.

The liquid LQ supplied from the supply nozzle 40 may contain at least one selected from VOC deodorant liquid, slightly acidic electrolytic water, sodium hypochlorite water, and silver ion water in addition to water. This makes it possible to remove odors generated by processing.

Figure 3:
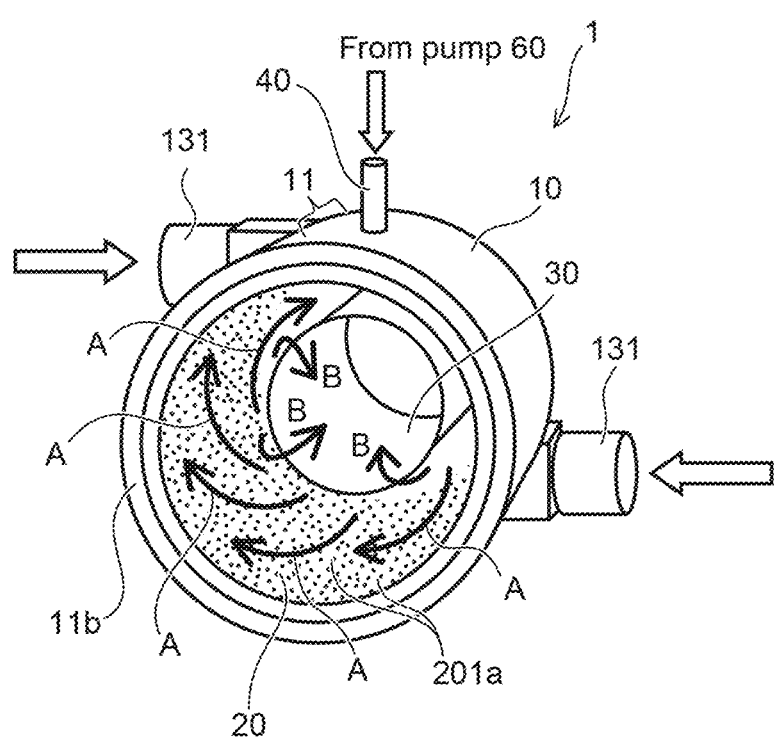
FIG. 3 is a schematic view exemplifying capture of dust and the like by a rotating airflow and a liquid catcher.

FIG. 3 is a schematic view exemplifying capture of dust and the like by the rotating airflow and the liquid catcher.

Figure 4:
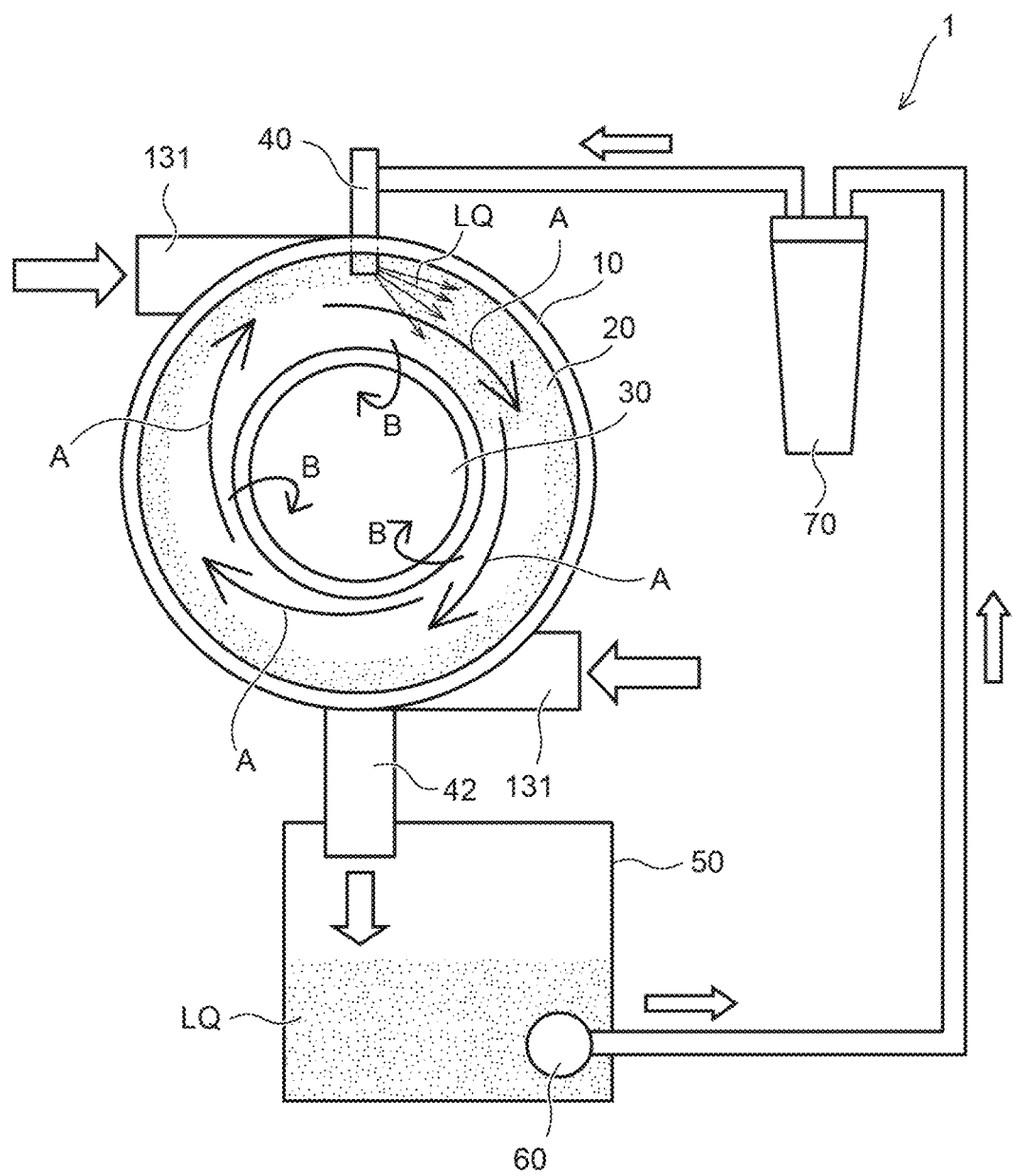
FIG. 4 is a schematic view exemplifying circulation of liquid.

FIG. 4 is a schematic view exemplifying circulation of the liquid.

When air is taken into the main body 10 from the introduction pipes 131 of the introduction part 13, the rotating airflow is generated inside the main body 10 as indicated by arrows A. Dust and the like contained in the air are centrifugally separated by the rotating airflow. When the liquid LQ is supplied into the main body 10 from the supply nozzle 40, the liquid LQ is rotated by the rotating airflow to constitute the liquid catcher 20. The centrifugally separated dust and the like are captured by the liquid catcher 20 provided along the inner wall surface of the main body 10.

Here, it is preferred that the supply nozzle 40 inject the liquid LQ along the arrows A which represent the flow direction of the rotating airflow. This allows the liquid LQ to efficiently diffuse along the rotating airflow. It is also preferred that the particle size of the liquid LQ be such that the liquid catcher 20 rotating on the inner wall surface of the main body 10 is constituted by the rotating airflow. If the particle size of the liquid LQ is unduly small, the effect of capturing the dust and the like by the liquid catcher 20 cannot be sufficiently obtained. On the other hand, if the particle size of the liquid LQ is unduly large, the effect of centrifugal separation of the dust and the like by the rotating airflow cannot be sufficiently obtained. An appropriate particle diameter of the liquid LQ is therefore set in accordance with the capacity of the main body 10, the flow rate of the rotating airflow, and the like.

In the dust collection device 1, the rotating airflow is generated inside the main body 10, and the dust and the like separated to outside by the centrifugal force due to the rotating airflow are captured by the liquid catcher 20 which utilizes the force pressing against the inner wall surface side of the main body 10. Then, the air from which the dust and the like are removed is discharged to the outside through the exhaust tube 30 extending to the outside from the central part in midstream of the main body 10, as indicated by arrows B.

When the liquid catcher 20 rotates in the main body 10, a part of the liquid LQ which constitutes the liquid catcher 20 is discharged little by little from the drain 42 provided below the main body 10 and is accumulated in the recovery unit 50. The recovery unit 50 is provided with the pump 60. The liquid LQ recovered into the recovery unit 50 is returned to the supply nozzle 40 by the pump 60. Thus, during the dust collection, the liquid LQ can circulate to continuously constitute the liquid catcher 20.

When circulating the liquid LQ, it is preferred to provide a filter 70 between the pump 60 and the supply nozzle 40. The filter 70 includes, for example, a hollow fiber filter. The liquid LQ recovered into the recovery unit 50 contains dust and the like. By passing through the filter 70, the dust and the like contained in the liquid LQ are removed and the clean liquid LQ can be returned to the supply nozzle 40 to prevent clogging of the nozzle.

In the dust collection device 1 according to the present embodiment, the liquid catcher 20 is formed in the main body 10 together with the rotating airflow, and the dust and the like contained in the sucked air can thereby be captured by the liquid catcher 20 while being centrifugally separated due to the rotating airflow. This allows the air to be discharged without being subjected to pressure loss due to a filter as compared with a device that collects dust through the filter and it is possible to suppress the reduction in the dust collection efficiency. Moreover, when discharging the air purified by the dust collection function, moisture can be contained in the air. This dust collection device 1 can therefore obtain a humidification effect in addition to the dust collection effect. Furthermore, the liquid catcher 20 allows even smoke and tar having high viscosity to be absorbed in the liquid LQ and effectively removed.

Figure 5:
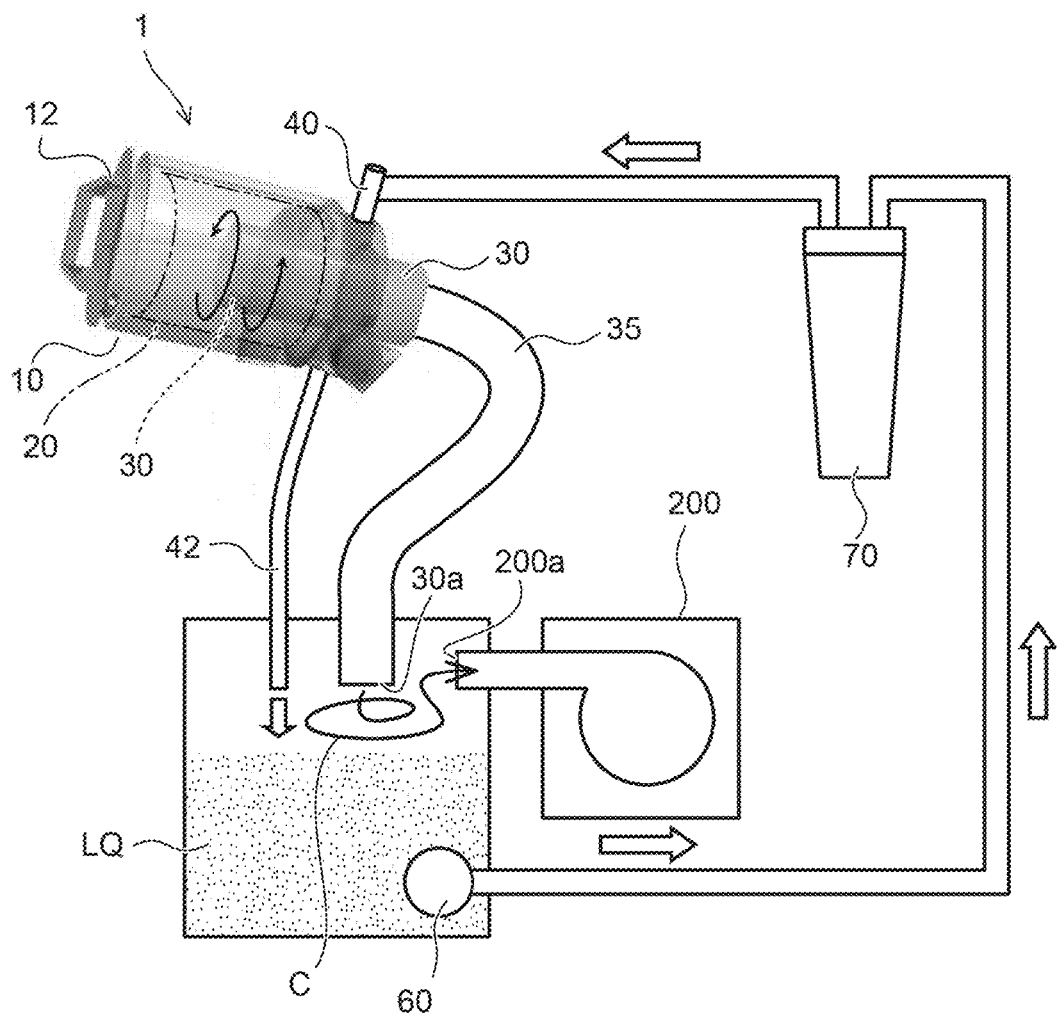
FIG. 5 is a schematic view exemplifying the connection between an exhaust tube and a suction device.

FIG. 5 is a schematic view exemplifying the connection between the exhaust tube and the suction device.

As illustrated in FIG. 5, the exhaust tube 30 is elongated with the exhaust duct 35, and the rear end is provided with a rear end opening part 30*a*. The exhaust duct 35 is inserted in the recovery unit 50, and the rear end opening part 30*a* is disposed inside the recovery unit 50.

On the other hand, the suction device 200 is provided with a suction port 200*a* that sucks air. The suction port 200*a* is disposed inside the recovery unit 50. That is, the rear end opening part 30*a* and the suction port 200*a* are arranged to be separate from each other in the recovery unit 50.

When suction is performed from the suction port 200*a* of the suction device 200 with such a configuration, the space provided in the upper part in the collection unit 50 has a negative pressure, and the inside of the exhaust tube 30 also has a negative pressure via the exhaust duct 35 from the rear end opening part 30*a* which is disposed in the same space. This allows the air in the main body 10 to be sucked from the opening of the exhaust tube 30 disposed in the main body 10. This suction force takes in the air, which contains dust and the like, from the dust collection nozzle 140. Thus, in the main body 10, the liquid catcher 20 is constituted together with the rotating airflow.

In such a dust collection operation, a part of the liquid LQ rotating as the liquid catcher 20 in the main body 10 is mixed with the sucked air and suctioned from the exhaust tube 30. The air sucked from the exhaust tube 30 is sent through the exhaust duct 35 from the rear end opening part 30*a* to the recovery unit 50 and taken in from the suction port 200*a* to the suction device 200.

During this operation, the rear end opening part 30*a* and the suction port 200*a* are separate from each other in the recovery unit 50; therefore, while the air is taken in from the rear end opening part 30*a* to the suction port 200*a*, the airflow is generated in the upper space in the recovery unit 50 as indicated by an arrow C in the figure. This airflow allows the liquid LQ contained in the air sucked from the exhaust tube 30 to be separated and spun off below the suction port 200*a*. This can suppress the amount of the liquid LQ suctioned from the suction port 200*a*.

Figure 6:
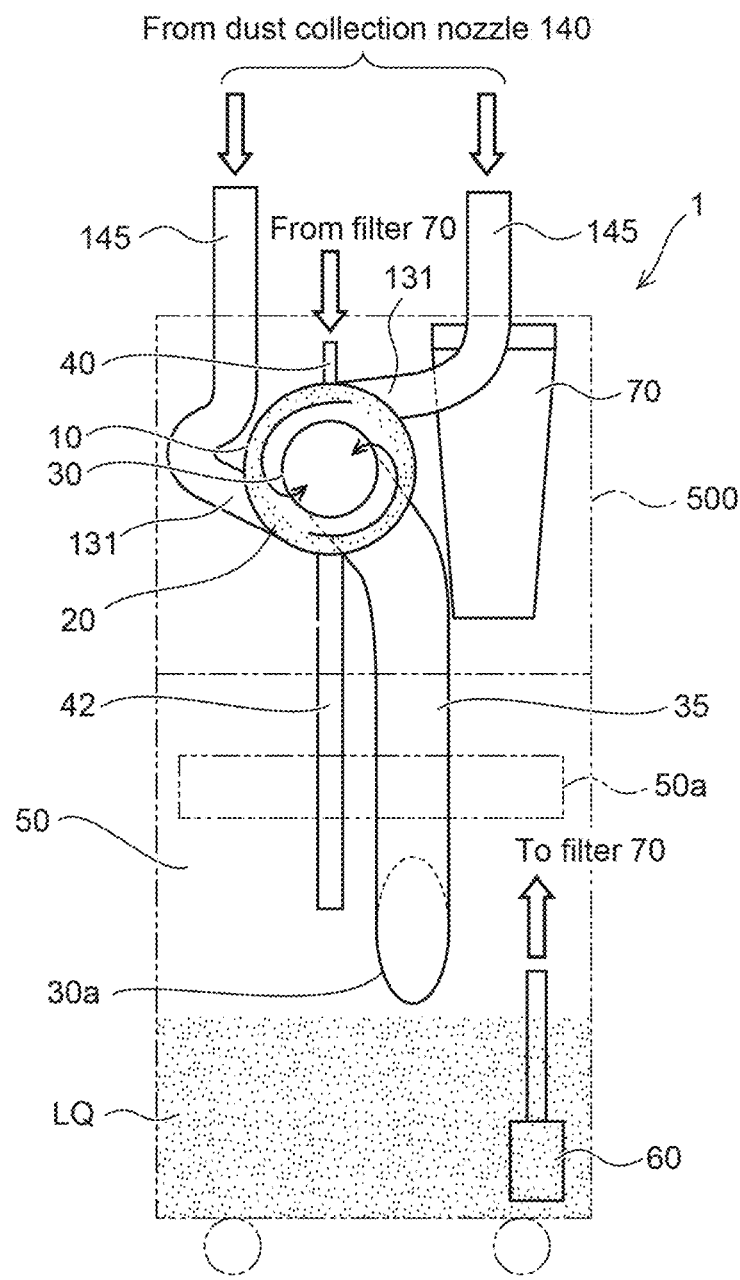
FIG. 6 is a schematic view illustrating an example in which the dust collection device according to the present embodiment is incorporated in a housing.
Figure 7:
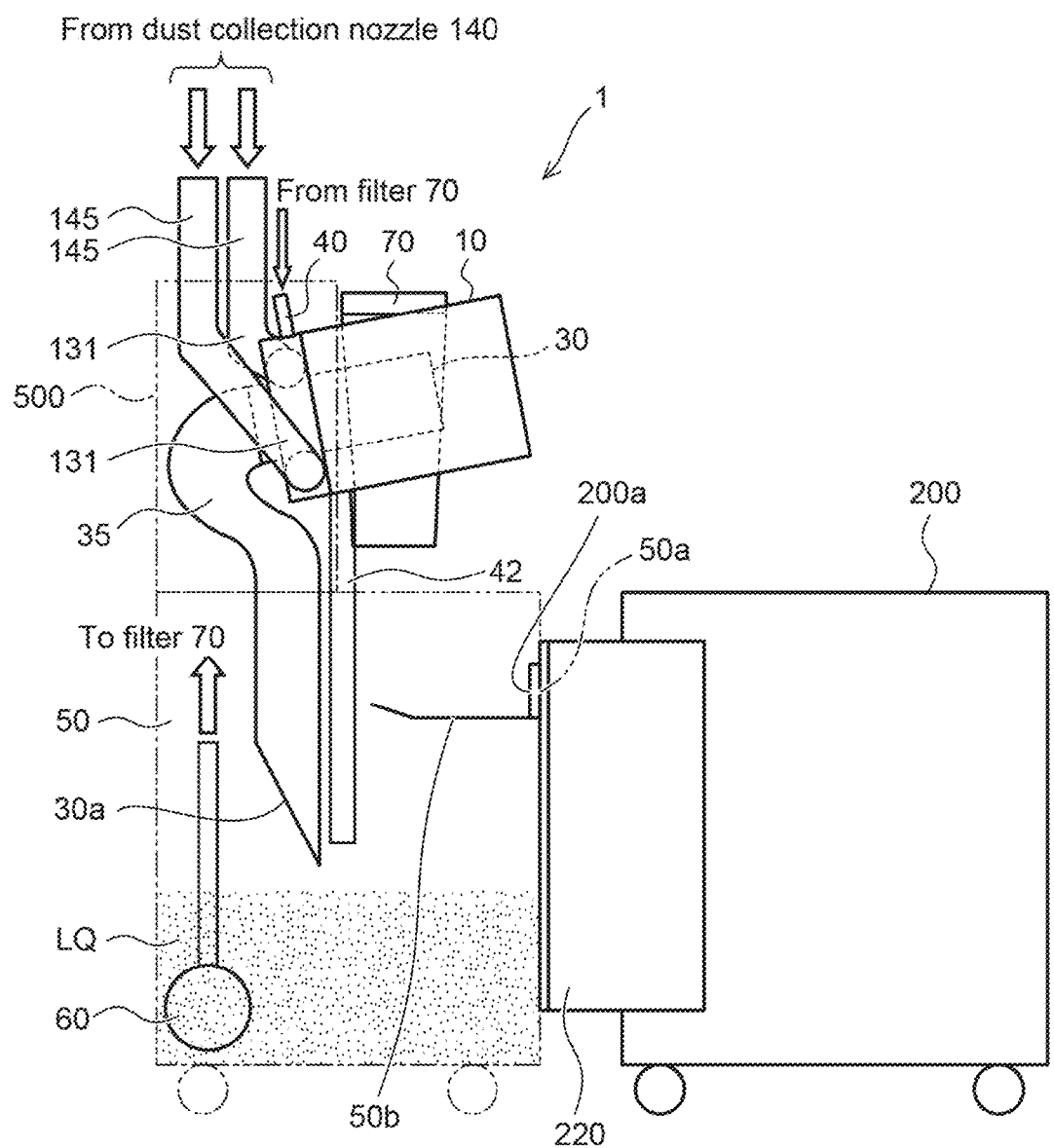
FIG. 7 is a schematic view illustrating an example in which the dust collection device according to the present embodiment is incorporated in a housing.

FIGS. 6 and 7 are schematic views illustrating an example in which the dust collection device according to the present embodiment is incorporated in a housing.

FIG. 6 is a front view and FIG. 7 is a side view. For descriptive purposes, the housing 500 is indicated by a two-dot chain line. In FIG. 6, the suction device 200 is omitted.

The main body 10 and the filter 70 are disposed at the upper part of the housing 500. The recovery unit 50 is disposed at the lower part of the housing 500.

The drain 42 extending from below the main body 10 is led into the recovery unit 50 provided at the lower part of the housing 500. The exhaust duct 35 extending from the exhaust tube 30 is led into the recovery unit 50 at the lower part from the upper part of the housing 500.

The upper part of the recovery unit 50 provided in the housing 500 is provided with an opening part 50*a* to which the suction port 200*a* of the suction device 200 is connected. This allows the air in the upper space of the recovery unit 50 to be taken in from the suction port 200*a*.

A filter unit 220 is provided between the opening part 50*a* and the suction device 200. In the present embodiment, the liquid catcher 20 captures a large amount of dust and the like and can therefore reduce the amount of dust and the like taken into the suction device 200. Thus, the maintenance frequency for the filter unit 220 can be reduced.

A separation plate 50*b* extending in the lateral direction from the lower side of the opening part 50*a* may be provided in the collection unit 50. Provision of the separation plate 50*b* can prevent the liquid LQ recovered in the recovery unit 50 from directly moving toward the opening part 50*a* due to the suction force when sucking air from the suction port 200*a*.

The rear end opening part 30*a* of the exhaust duct 35 led into the recovery unit 50 may be provided so as to face the side opposite to the opening part 50*a*. For example, the rear end of the exhaust duct 35 is obliquely cut. This allows the rear end opening part 30*a* to face the side opposite to the opening part 50*a*. Moreover, the rear end opening part 30*a* does not face the liquid LQ side. In this way, a long path is formed in the flow of air from the rear end opening part 30*a* toward the suction port 200*a*, and the airflow is readily generated in the upper space of the recovery unit 50. This airflow separates the liquid LQ contained in the air to increase the recovery rate of the liquid LQ in the recovery unit 50, and the amount of the liquid LQ suctioned from the suction port 200*a* can be reduced.

As described above, the main body 10, the filter 70, and the recovery unit 50 are incorporated in the housing 500, and installation and movement of the dust collection device 1 can thereby be easy. By disposing the filter 70 at a position that can be seen from the outside and configuring the filter 70 with a transparent case, it is possible to easily check the contamination degree of the filter 70. Replacement work for the filter 70 is also facilitated. In an embodiment, the recovery unit may be provided with a liquid supply port, a discharge drain, and a liquid level sensor for the liquid and it is thereby possible to perceive the amount of liquid in the recovery unit and periodically replace the liquid.

Figure 8:
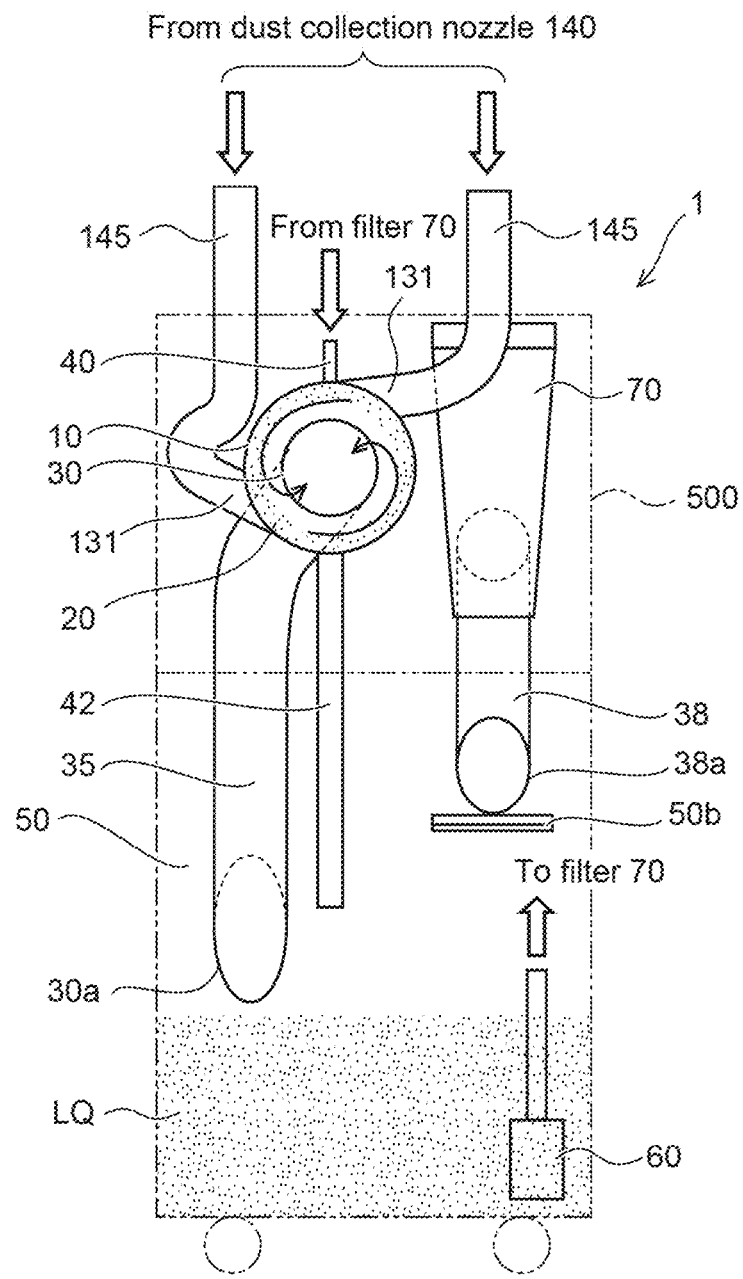
FIG. 8 is a schematic view illustrating another example in which the dust collection device according to the present embodiment is incorporated in a housing.
Figure 9:
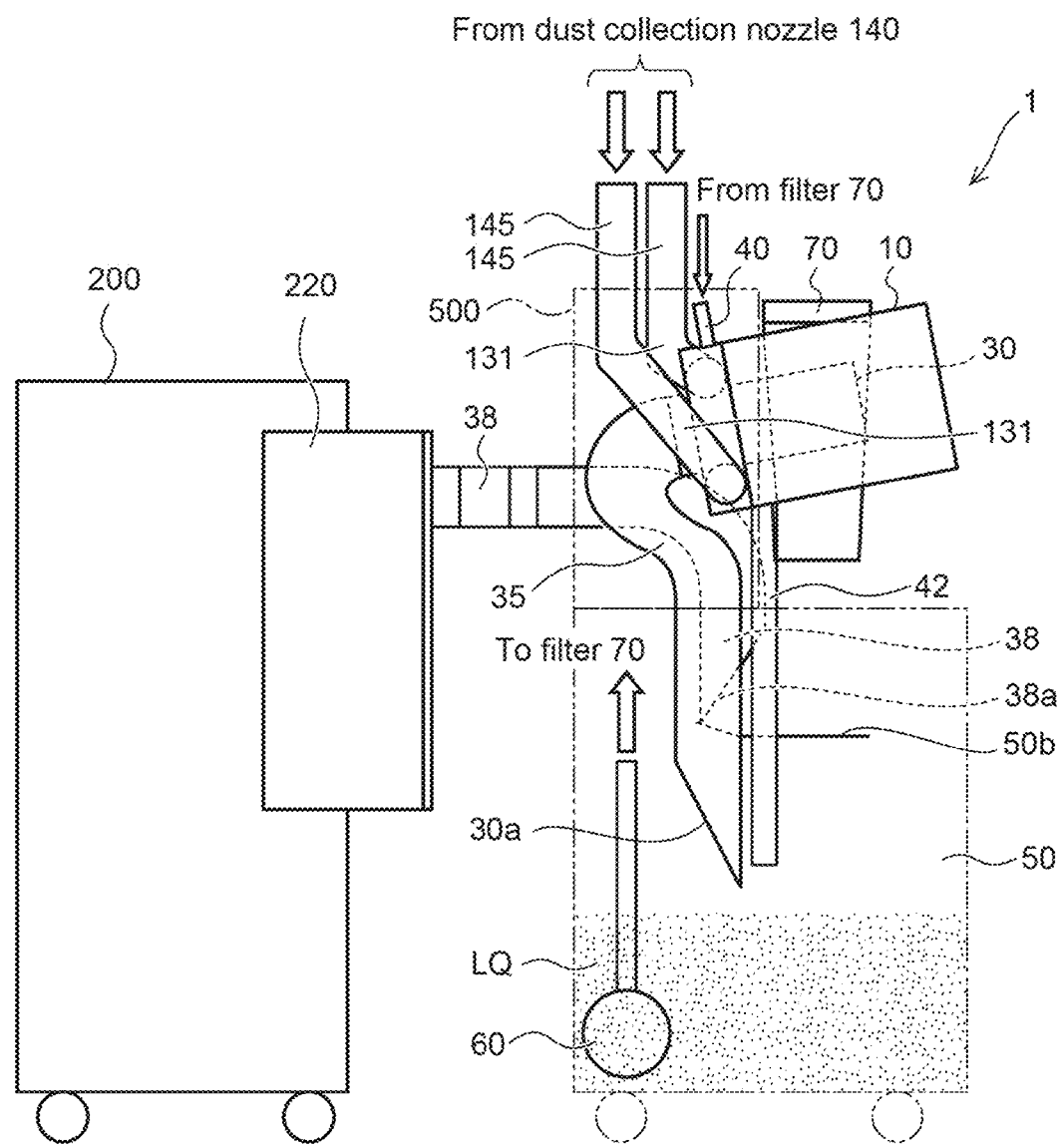
FIG. 9 is a schematic view illustrating another example in which the dust collection device according to the present embodiment is incorporated in a housing.

FIGS. 8 and 9 are schematic views illustrating another example in which the dust collection device according to the present embodiment is incorporated in a housing.

FIG. 8 is a front view and FIG. 9 is a side view. For descriptive purposes, the housing 500 is indicated by a two-dot chain line. In FIG. 8, the suction device 200 is omitted.

In this example, a discharge duct 38 is provided which extends to the outside of the housing 500 from above the recovery unit 50 provided at the lower part of the housing 500. The discharge duct 38 is connected to the filter unit 220 of the suction device 200.

A suction port 38a that is one end of the discharge duct 38 in the housing 500 may be obliquely provided. For example, the rear end of the discharge duct 38 is obliquely cut. The suction port 38a is preferably opened toward the opposite direction to the rear end opening part 30a. The separation plate 50b may be provided on the lower side of the suction port 38a.

The height of the suction port 38a is preferably higher than the height of the rear end opening part 30a. In this way, a long path is formed in the flow of air from the rear end opening part 30a toward the suction port 38a, and the airflow is readily generated in the upper space of the recovery unit 50. This airflow separates the liquid LQ contained in the air to increase the recovery rate of the liquid LQ in the recovery unit 50, and the amount of the liquid LQ suctioned from the suction port 38a can be reduced.

In this example, the recovery unit 50 and the suction device 200 are connected via the discharge duct 38, and the degree of freedom in locating the suction device 200 is increased when flexibly arranging the discharge duct 38.

(Angle of Introduction Pipe)

Here, the angle of the introduction pipes 131 connected to the main body 10 will be described.

Figure 10:
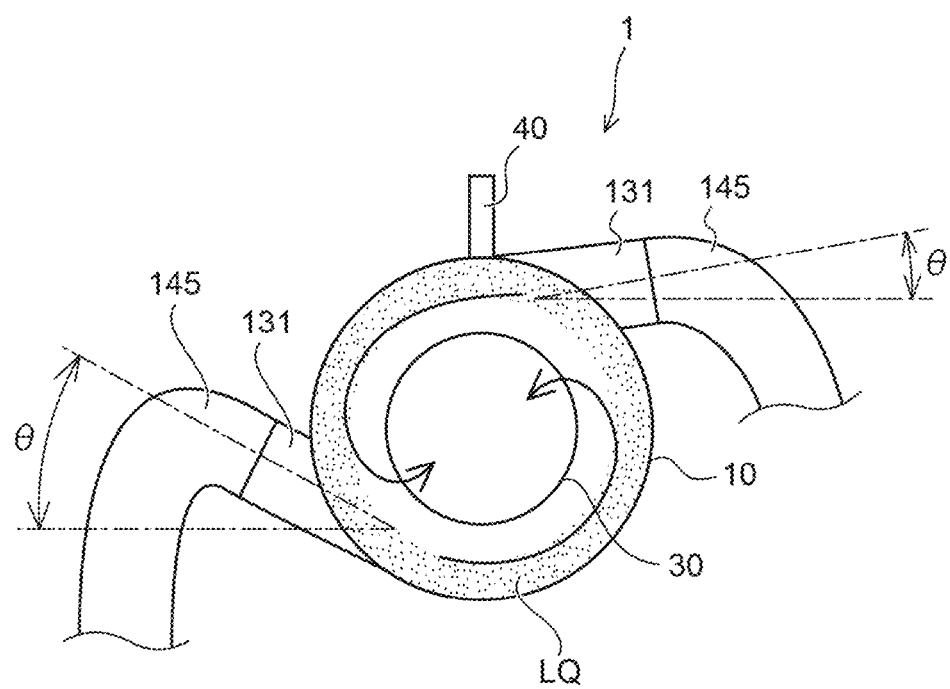
FIG. 10 is a schematic view exemplifying the angle of introduction pipes.

FIG. 10 is a schematic view exemplifying the angle of the introduction pipes.

FIG. 10 illustrates a schematic view of the main body 10 as viewed from the front.

When the introduction pipes 131 are connected to the main body 10 from the sides, the introduction pipe 131 may be arranged horizontally, but may also be connected obliquely downward from above.

In the example illustrated in FIG. 10, the introduction pipes 131 are connected to the main body 10 obliquely downward from obliquely above the main body 10. That is, the introduction pipes 131 are inclined obliquely upward in directions away from the connection positions with the main body 10. When the connection angle of each introduction pipe 131 with respect to the horizontal direction is θ, θ is 5° or more and less than 90°, preferably 5° or more and less than 45°, and more preferably 10° or more and less than 30°.

When the introduction pipes 131 are connected to the main body 10 in such an inclined fashion thereby to allow the liquid LQ to rotate in accordance with the rotating airflow in the main body 10, it is possible to suppress the flowback of the liquid LQ to the introduction pipes 131. This will be more specifically described. When the liquid LQ rotates in the main body 10, the liquid LQ is pressed to the outside by the centrifugal force and tends to flow back into the introduction pipes 131. Particularly in the case of a configuration in which the suction ducts 145 are connected to the introduction pipes 131 from below the main body 10, the flowback of the liquid LQ to the introduction pipes 131 causes the liquid LQ to readily enter the suction ducts 145. Even in such a configuration, when the introduction pipes 131 are inclined as described above, it is possible to effectively suppress the flowback of the rotating liquid LQ from the introduction pipes 131 to the suction ducts 145.

(Another Embodiment)

Another embodiment of the dust collection device 1 will then be described.

Figure 11:
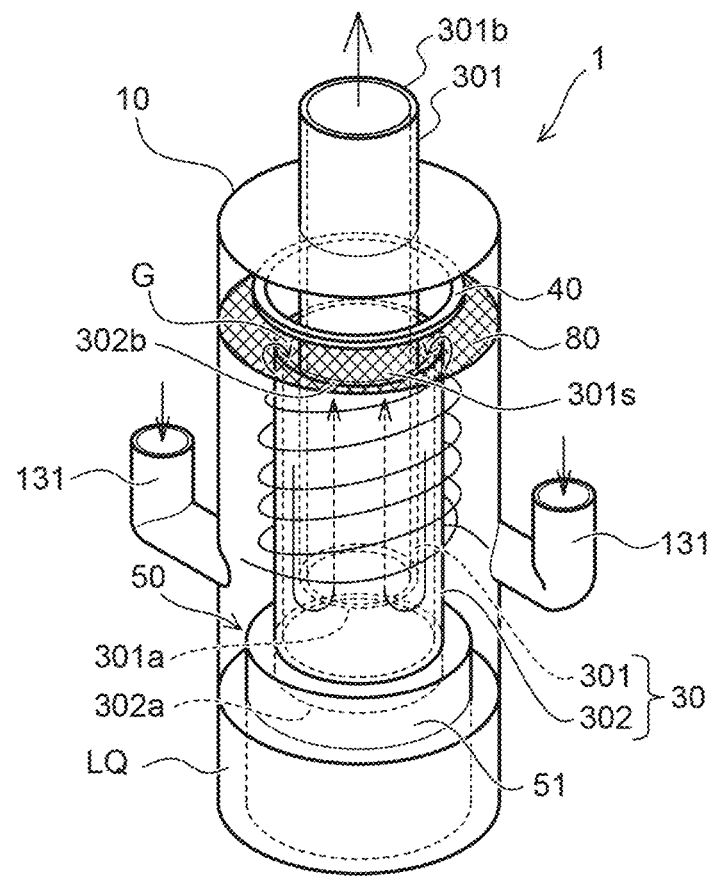
FIG. 11 is a perspective view exemplifying a dust collection device according to another embodiment.

FIG. 11 is a perspective view exemplifying a dust collection device according to another embodiment.

Figure 12:
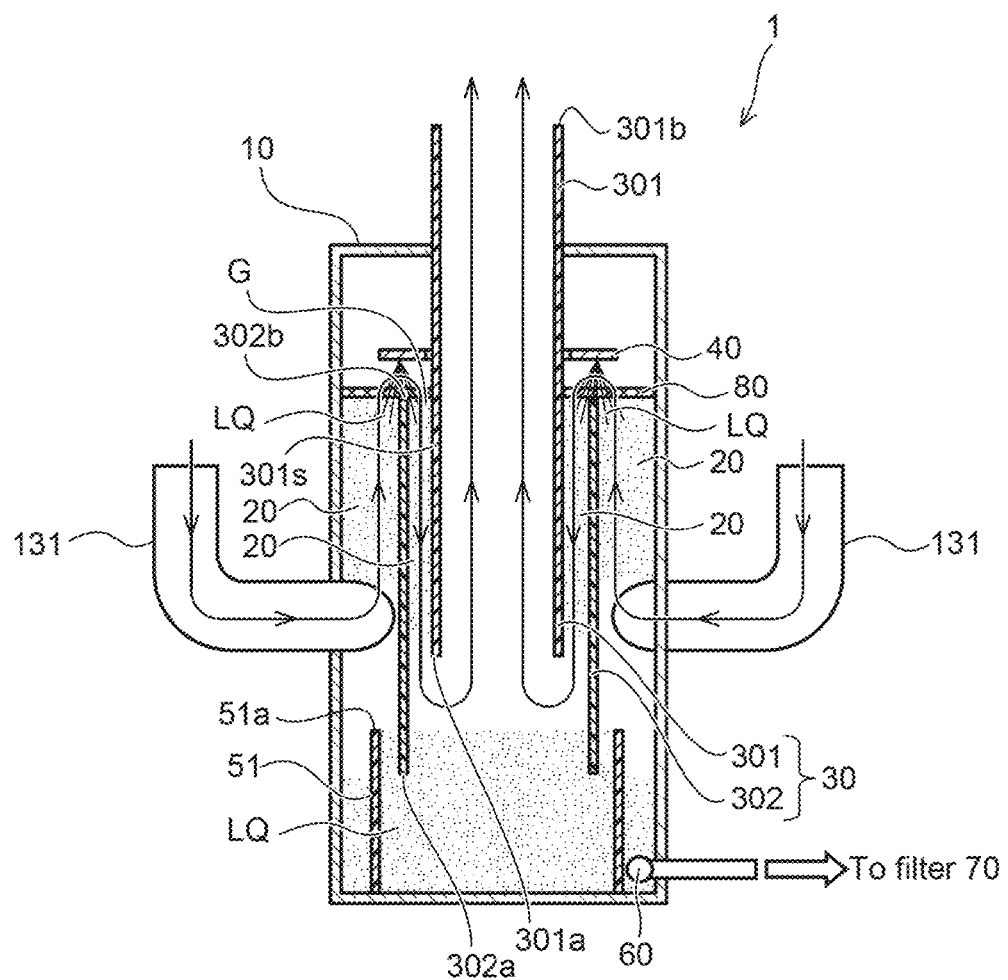
FIG. 12 is a cross-sectional view exemplifying a dust collection device according to another embodiment.

FIG. 12 is a cross-sectional view exemplifying the dust collection device according to this embodiment.

For descriptive purposes, FIG. 11 illustrates a view when the portion of the main body 10 is seen through.

In the dust collection device 1 according to this embodiment, the recovery unit 50 is provided on the side opposite to the exhaust tube 30 inside the main body 10. That is, the recovery unit 50 has an integrated structure with the main body 10. The main body 10 is arranged with the recovery unit 50 facing downward because the liquid LQ is recovered into the recovery unit 50.

The exhaust tube 30 has an inner tube 301 and an outer tube 302. The outer tube 302 is disposed outside the inner tube 301. The inner tube 301 and the outer tube 302 are arranged approximately coaxially and a gap is provided between the outer circumferential surface of the inner tube 301 and the inner circumferential surface of the outer tube 302.

One end 302a of the outer tube 302 on the recovery unit 50 side extends beyond one end 301a of the inner tube 301 on the recovery unit 50 side toward the recovery unit 50 side. A gap G is formed between the other end 302b of the outer tube 302 and an outer circumferential surface 301s of the inner tube 301. The other end 301b of the inner tube 301 extends outside from the main body 10.

The supply nozzle 40 is in a ring shape and disposed along the outer circumferential surface 302s of the inner tube 301 above the other end 302b of the outer tube 302. A net-like body 80 may be provided between the supply nozzle 40 and the gap G.

The recovery unit 50 provided below the main body 10 is provided with a tubular inner wall 51. The upper end 51a of the inner wall 51 is higher than the one end 302a which is the lower end of the outer tube 302. That is, the one end 302a of the outer tube 302 is arranged to get into inside of the tube of the inner wall 51. With such an inner wall 51, the height of the liquid LQ recovered in the collection unit 50 reaches the upper end 51a of the inner wall 51. This allows the one end 302a of the outer tube 302 to be in a state of being immersed in the liquid LQ inside the inner wall 51. On the other hand, the one end 301a which is the lower end of the inner tube 301 is disposed at a position higher than the upper end 51a of the inner wall 51. A gap is therefore formed between the one end 301a of the inner tube 301 and the liquid LQ.

In such a dust collection device 1, the air which contains dust and the like sucked from the dust collection nozzle 140 is sucked up through the two suction ducts 145 and taken into the main body 10 from the introduction pipes 131. The two introduction pipes 131 are attached to the positions on the main body 10, which are shifted from each other by 180°, and the air taken into the main body 10 therefore spirals along the outer circumference of the outer tube 302 and becomes the rotating airflow.

The air having been the rotating airflow rises along the outer tube 302 and progresses from the gap G to the gap between the inner tube 301 and the outer tube 302. The air progressing to the gap between the inner tube 301 and the outer tube 302 becomes the rotating airflow in this gap and moves downward. Then, the air enters the inside of the inner tube 301 from the one end 301a of the inner tube 301 to rise again and is discharged to the outside of the main body 10.

In addition to such suction of air, supply of the liquid LQ from the supply nozzle 40 promotes diffusion of the liquid LQ into the rotating airflow outside the inner tube 301. When the net-like body 80 is provided, the liquid LQ is injected from the supply nozzle 40 toward the net-like body 80 thereby to allow the liquid LQ to diffuse when passing through the net-like body 80, and the liquid LQ can be efficiently included in the rotating airflow. This state is comparable with a state in which the net-like body is constantly washed because the liquid is continuously injected from the upper part, and clogging is less likely to occur.

The liquid LQ is included not only in the rotating airflow generated outside the outer tube 302 but also in the rotating airflow generated in the gap between the inner tube 301 and the outer tube 302. Accordingly, two liquid catchers 20 are constituted in the main body 10 in accordance with these rotating airflows. The dust and the like centrifugally separated by the rotating airflows are captured by the liquid LQ of the liquid catchers 20. The liquid LQ in which the dust and the like are captured is gradually recovered in the recovery unit 50 located below the main body 10. Then, the liquid LQ accumulated in the recovery unit 50 is sent to the filter 70 by the pump 60 for filtration and thereafter returned to the supply nozzle 40 again.

According to such a dust collection device 1, the device configuration can be reduced in size because the recovery unit 50 is integrated with the main body 10. Moreover, the liquid LQ is recovered in the lower recovery unit 50 along the inner tube 301 and the outer tube 302 and, therefore, piping such as a drain 42 is unnecessary. This allows the device configuration to be simplified. In the example illustrated in FIG. 12, air is taken into the main body 10 from the introduction pipes 131 and discharged from the inner tube 301 to the outside of the main body 10, but contrarily, air may be taken into the main body 10 from the inner tube 301 and discharged from the introduction pipes 131 to the outside of the main body 10.

(Introduction Port)

FIGS. 13(a) and 13(b) are cross-sectional views illustrating introduction ports.

When air flows into the main body 10 from the introduction pipes 131, the flow rate of air can be increased thereby to increase the rotation speed of the rotating airflow.

In the example illustrated in FIG. 13(a), the diameter of the exhaust tube 30 is increased so that the gap d2 between the exhaust tube 30 and the main body 10 becomes narrower than the inner diameter d1 of the introduction pipes 131 of the main body 10. This can narrow the flow path of the air flowing from the introduction pipes 131 to the main body 10, thus increasing the rotation speed of the rotating airflow generated outside the exhaust tube 30.

In the example illustrated in FIG. 13(b), a plate 132 is provided on the inlet side of each introduction pipe 131 of the main body 10. The flow path of the air flowing from the introduction pipe 131 to the main body 10 is gradually narrowed due to the plate 132, so that the flow speed of air when entering the main body 10 can be increased thereby to increase the rotation speed of the rotating airflow.

In any of the examples, the efficiency of centrifugal separation can be improved by increasing the rotation speed of the rotating airflow generated in the main body 10.

(Dust Collection Nozzle)

FIG. 14 is a cross-sectional view illustrating an example of the dust collection nozzle.

One of the inventors of the present application created a dust collection nozzle 140 as illustrated in FIG. 14 and a patent was granted (JP5729739B).

This dust collection nozzle 140 has a rotationally symmetric shape that can surround the laser light emitted from a laser emitting head 130. The dust collection nozzle 140 surrounds a conical space 23 necessary for forming a scan area 21 of the laser light.

A gap 31 is provided between the lower edge 29 of the dust collection nozzle 140 and the object W, and the surrounding air is supplied into the dust collection nozzle 140. In addition, a compressed air supply port 33 is connected to the lower end of the dust collection nozzle 140, and the compressed air is supplied into the dust collection nozzle 140 thereby to generate a spiral flow in the dust collection nozzle 140.

The suction ducts 145 are connected to a skirt part 25 of the dust collection nozzle 140. The suction ducts 145 are each connected in a tangential direction in the horizontal cross section of the skirt part 25 and perform exhaust by a negative pressure of a suction pump that communicates with the suction ducts 145 via bellows tubes (not illustrated) or the like. This generates a spiral flow 36 in the dust collection nozzle 140.

According to the dust collection nozzle 140, the air 41 supplied into the dust collection nozzle 140 through the gap 31 provided between a lower edge 29 of the dust collection nozzle 140 and the object W, and the air supplied into the dust collection nozzle 140 from the compressed air supply port 33 at the lower end of the dust collection nozzle 140, substantially entrain the air in the vicinity of the laser processing site to form an upward flow, which then becomes the spiral flow 36 along the rotationally symmetric shape of the dust collection nozzle 140 and is exhausted through the suction ducts 145 toward the tangential directions of the rotationally symmetrical shape. Further, the air 45 supplied through a gap 32 between the upper edge of an elevating part 27 and the laser emitting head 130 becomes a downward flow to merge into the spiral flow 36 and is exhausted through the suction ducts 145.

By using such a dust collection nozzle 140, it is possible to efficiently suck the dust and the like during the processing in the processing machine 100. When using such a dust collection nozzle 140 having a high suction efficiency, clogging of a filter may occur in a short time in a dust collector using an ordinary filter. In this regard, the dust collection device 1 according to the present embodiment can be applied thereby to achieve effective dust collection without causing the clogging because of the efficient suction of dust and the like. Moreover, the two suction ducts 145 can be connected to two respective introduction pipes 131 of the dust collector 1 because the dust collection nozzle 140 sucks using the two suction ducts 145. Thus, the dust collection nozzle 140 and the dust collection device 1 are excellent in connection matching with each other.

As described above, according to the dust collection device 1 of the embodiments, dust and the like can be efficiently separated and removed without using a filter.

Although the present embodiments and specific examples thereof have been described above, the present invention is not limited to these examples. For example, examples have been described in which the two introduction pipes 131 are attached to the main body 10, but one or three or more introduction pipes 131 may be attached to the main body 10. Moreover, in addition to the case in which the laser emitting head 130 is provided on the moving unit 150 which moves in one axial direction, another case may also be employed in which the laser emitting head 130 is provided on a multi-jointed arm. In another embodiment, two or more dust collection devices 1 may be arranged in parallel or in series thereby to configure a dust collection system having higher dust collection efficiency. In the above embodiments, the exemplary configuration is provided with the supply nozzle 40 which supplies the liquid LQ and the recovery unit 50 which recovers the liquid LQ, but another configuration may also be employed in which the supply nozzle 40 is not provided and/or the recovery unit 50 is not provided. In the configuration in which the supply nozzle 40 is not provided, a certain amount of the liquid LQ is preliminarily put in the main body 10 and suctioned in this state to form the liquid catcher 20 to capture dust and the like. In the configuration in which the recovery unit 50 is not provided, after the capture of dust and the like is completed, the main body 10 may be tilted to discharge the liquid LQ, or the liquid LQ may be discharged from the drain 42. The scope of the present invention encompasses those in which a person skilled in the art appropriately adds or delete constitutional elements, changes designs, or combines features of the embodiments for the previously-described embodiments or specific examples thereof, as long as the subject matter of the present invention is provided.

INDUSTRIAL APPLICABILITY

As described above, the dust collection device 1 of the present invention can be suitably utilized not only for laser processing machines but also for processing machines 100 which generate smoke and/or dust during the processing, such as a laser welding machine, a heating device using laser or other energy than laser, a cutting device with a blade, and a three-dimensional shape forming device (3D printer). The dust collection device 1 can also be utilized not only for the processing machines 100 but also for cases of sucking indoor or outdoor air in a factory or the like for dust collection or as household dust collection (air cleaning) and humidifying devices.

DESCRIPTION OF REFERENCE NUMERALS

1 Dust collection device
10 Main body
11 Straight body part
12 Lid
13 Introduction part
20 Liquid catcher
30 Exhaust tube
30*a* Rear end opening part
35 Exhaust duct
36 Spiral flow
38 Discharge duct
38*a* Suction port
40 Supply nozzle
42 Drain
50 Recovery unit
50*a* Opening part
50*b* Separation plate
51 Inner wall
51*a* Upper end
60 Pump
70 Filter
80 Net-like body
100 Processing machine
110 Processing machine main body
111 Switches
115 Display
116 Keyboard
117 Mouse
120 Stage
130 Laser emitting head
131 Introduction pipe
140 Dust collection nozzle
145 Suction duct
150 Moving unit
200 Suction device
200*a* Suction port
220 Filter unit
301 Inner tube
301*a* One end
301*b* Other end
301*s* Outer circumferential surface
302 Outer tube
302*a* One end
302*b* Other end
302*s* Outer circumferential surface
500 Housing
LQ Liquid
W Object

The invention claimed is:

1. A dust collection method using a dust collection device, the dust collection device comprising: a main body provided in a tubular shape; an exhaust tube having an opening inside the main body, the exhaust tube being provided so as to have an end which extends through and outside the main body, and having a distal end which begins at a mid-point within the main body, and so as to cooperate with a suction device to suck air inside the main body; a supply nozzle for supplying a liquid to inside of the main body; a vessel having an inlet with a fluid connection to the exhaust tube and an outlet with a fluid connection to the supply nozzle, the vessel being configured to recover the liquid from the main body; and a pump for returning the liquid from the vessel to the supply nozzle, the main body being arranged oblique so that the opening side of the exhaust tube faces upward, the dust collection method comprising:
a step of forming a rotating airflow by means of suction with the suction device, the rotating airflow progressing while spiraling along an inner wall surface of the main body;
a step of supplying the liquid from the supply nozzle;
a step of spreading out the liquid with the rotating airflow on the inner wall surface thereby to continuously form a liquid catcher, the liquid catcher rotating as a film of the liquid; and
a step of separating smoke and/or dust contained in air introduced to the inside of the main body by accelerating said smoke and/or dust towards the inner surface of the main body by centrifugal force due to the rotating airflow and capturing the smoke and/or dust with the liquid catcher.

2. The dust collection method as recited in claim 1, wherein during the dust collection, the liquid is continuously or intermittently supplied from the supply nozzle, a part of the liquid constituting the liquid catcher is recovered from the main body using the vessel, the recovered liquid is returned to the supply nozzle using the pump thereby to circulate the liquid, and the liquid catcher rotating inside the main body is continuously formed.

3. The dust collection method as recited in claim 1, wherein
a rear end of the exhaust tube is provided with a rear end opening part,
the suction device is provided with a suction port,
the rear end opening part and the suction port are arranged to be separate from each other in the vessel, and during the dust collection, a part of the liquid suctioned from the exhaust tube is sent from the rear end opening part to the vessel.

4. A dust collection device comprising:
a main body provided in a tubular shape and generating a rotating airflow inside the main body by sucked air;
an exhaust tube provided so as to have an end which extends through and outside the main body, and having a distal end which begins at a mid-point within the main body;
a supply nozzle for supplying a liquid for forming a liquid catcher utilizing the rotating airflow, the liquid catcher rotating as a film of the liquid along an inner wall surface of the main body;
a vessel having an inlet with a fluid connection to the exhaust tube and an outlet with a fluid connection to the supply nozzle, the vessel being configured to recover the liquid included in the rotating airflow in the main body; and
a pump for returning the liquid from the vessel to the supply nozzle, wherein
the vessel is provided on a side opposite to the exhaust tube inside the main body,
the exhaust tube has an inner tube and an outer tube, one end of the outer tube of the exhaust tube extends beyond one end of the inner tube of the exhaust tube toward the vessel,
a gap is provided between another end of the outer tube and an outer circumferential surface of the inner tube,
a net-like body is provided in the gap,
another end of the inner tube extends outside from the main body, and
the supply nozzle injects the liquid toward the net-like body.

5. The dust collection device as recited in claim 4, wherein the supply nozzle injects the liquid toward a direction of a flow of the rotating airflow.

6. The dust collection device as recited in claim 4, further comprising a filter provided between the pump and the supply nozzle.

7. A laser processing machine comprising:
a laser emitting head for emitting laser light with which an object is irradiated;
a duct for sucking and taking in smoke and/or dust generated from the object; and
the dust collection device as recited in claim 4, the dust collection device being provided in a middle of the duct as a fluid passage.

* * * * *